J. BROWN.
Whiffletree Hook.
No. 83,454. Patented Oct. 27, 1868.
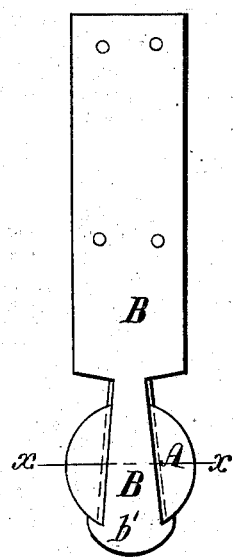
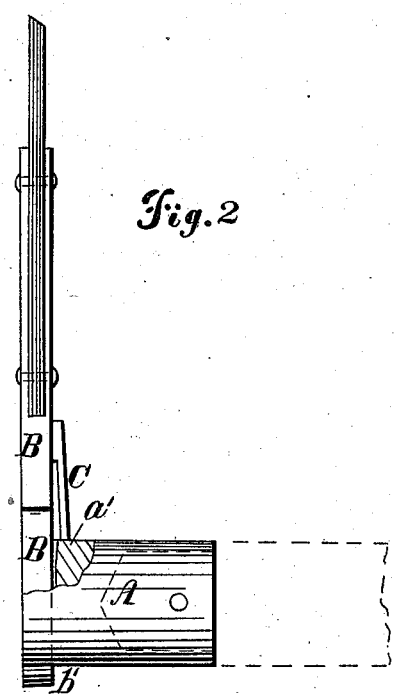
Witnesses:
Inventor:
James Brown

JAMES BROWN, OF MATTEAWAN, NEW YORK.

Letters Patent No. 83,454, dated October 27, 1868.

IMPROVED TRACE-FASTENING.

The Schedule referred to in these Letters Patent and making part of the same.

*To all whom it may concern:*

Be it known that I, JAMES BROWN, of Matteawan, in the county of Dutchess, and State of New York, have invented a new and improved Trace-Fastening; and I do hereby declare that the following is a full, clear, and exact description thereof, which will enable others skilled in the art to make and use the same, reference being had to the accompanying drawings, forming part of this specification, in which—

Figure 1 is an end view of my improved trace-fastening.

Figure 2 is a side view of the same, part being broken away to show the construction.

Figure 3 is a detail sectional view of the same, taken through the line $x\ x$, fig. 1.

Similar letters of reference indicate corresponding parts.

My invention has for its object to furnish an improved fastening for securing the traces to the whiffletrees, which shall be simple in construction, easily attached and detached, and not liable to become accidentally detached.

And it consists in the socket having a tapering dovetailed grove formed in its end, the tapering dovetailed strap or bar having a cross-head formed upon its end, and the guard-spring, in combination with each other, as hereinafter more fully described.

A is the socket, the inner end of which is made hollow to receive the end of the whiffletree, to which it is securely attached. The outer end of the socket A is made solid, and has a tapering dovetailed groove formed in it, as shown in the drawings.

B is a bar or strap, the forward end of which may be slotted or made forked, to receive the end of the trace, as shown in red in fig. 2, or it may be made single to enter the said trace, to which, in either case, it should be securely attached. The rear part of the strap or bar B is made tapering and dovetailed, as shown in figs. 1, 2, and 3, to fit into the tapering dovetailed groove in the end of the socket A. Upon the extreme rear end of the strap or bar B is formed a cross-head, $b'$, the ends of which, when the dovetailed tapering part of said strap or bar is drawn closely into the groove in the socket A, strike against the rear side of the said socket A, as shown in figs. 1 and 2, and prevent the said strap or bar from becoming too closely wedged into its groove by the draught-strain upon it, so that it may be easily removed when desired.

C is a spring attached to the inner side of the forward part of the strap or bar B, in such a position that, when the said bar or strap is drawn forward into its place, the rear or free end of the said spring may rest against the forward side of the socket A, and prevent the fastening from becoming accidentally detached.

In the bottom of the forward end of the dovetailed groove in the end of the socket A, is formed an inclined recess, $a'$, into which the rear end of the spring C may be depressed, when it is desired to detach the fastening, and along which the said spring slides as the bar or strap B is pushed back, in detaching it, until the said strap or bar has become sufficiently loose to rise and allow the said spring to slide along the bottom of the said groove.

Having thus described my invention,

What I claim as new, and desire to secure by Letters Patent, is—

1. The socket A, having a tapering dovetailed groove formed in its outer end, the strap or bar B, having its rear part dovetailed and tapering, and having a cross-head, $b'$, formed upon its rear end, and the spring C, or equivalent, in combination with each other, substantially as herein shown and described, and for the purpose set forth.

2. Forming an inclined recess, $a'$, in the bottom of the forward end of the dovetailed groove in the end of the socket A, to receive the end of the spring C, in detaching the fastening, substantially as herein shown and described, and for the purpose set forth.

JAMES BROWN.

Witnesses:
JOHN VANDERBURGH,
CHARLS HAWKS.